3,300,545
BLENDS OF POLYSTYRENE AND A GRAFT CO-
POLYMER OF A STYRENE-METHYL METHAC-
RYLATE TYPE MIXTURE ON A RUBBERY POLY-
MER OF A CONJUGATED 1,3-DIENE
Massimo Baer, Longmeadow, Mass., assignor to Monsanto
Company, a corporation of Delaware
No Drawing. Filed Aug. 13, 1962, Ser. No. 216,282
3 Claims. (Cl. 260—876)

This application is a continuation-in-part of my copending application S.N. 779,519, filed December 19, 1958, which in turn is a continuation-in-part of my copending application S.N. 706,543, filed January 2, 1958, both of which application are now abandoned.

The invention relates to blends of (A) a rigid thermoplastic polymer of a monovinyl aromatic monomer and (B) a graft copolymer prepared by polymerizing a mixture of a monovinyl aromatic monomer and a lower alkyl acrylate monomer in an aqueous dispersion of a diene rubber.

It is an object of the invention to provide novel polyblends consisting predominantly of a rigid thermoplastic polymer of a monovinyl aromatic monomer.

This and other objects are attained by blending (A) a rigid thermoplastic polymer of a monovinyl aromatic monomer with (B) a graft copolymer prepared by polymerizing about 25–100 parts by weight of a mixture of a monovinyl aromatic monomer and a lower alkyl acrylate monomer in an aqueous dispersion of 100 parts by weight of a diene rubber, as hereinafter more completely described.

The following examples and descriptions are given to illustrate the invention. Unless otherwise specified, quantities mentioned are quantities by weight.

RIGID POLYMER A

Rigid Polymer A is a commercial polystyrene having a Staudinger average molecular weight of about 60,000.

RIGID POLYMER B

Rigid Polymer B is a commercial styrene-acrylonitrile (72:28) copolymer.

RIGID POLYMER C

Rigid Polymer C is a styrene-methyl methacrylate (50:50) copolymer.

RUBBER LATEX A

Rubber Latex A is a polybutadiene latex prepared from the following polymerization recipe:

| Component: | Parts |
|---|---|
| Water | 200 |
| Butadiene | 100 |
| Sodium stearate | 5 |
| t-Dodecyl mercaptan | 0.4 |
| Potassium persulfate | 0.3 |

The latex is prepared by (1) charging the water and soap to a pressure-resistant, stirred reaction vessel, (2) boiling the resultant soap solution to remove dissolved oxygen, (3) cooling under nitrogen, (4) adding the remaining components of the polymerization recipe, (5) sealing the reaction vessel, (6) effecting polymerization by heating the stirred reaction mixture at 50° C. for about 48 hours, and (7) venting unreacted butadiene. The reaction results in about 95% conversion of monomer to polymer.

RUBBER LATEX B

Rubber Latex B is a butadiene-styrene copolymer latex prepared in the same manner as Rubber Latex A except for the substitution of 70 parts of butadiene and 30 parts of styrene for the 100 parts of butadiene in the polymerization recipe.

GRAFT COPOLYMERS A–D

Each of Graft Copolymers A–D is a graft copolymer prepared by (1) charging a mixture of styrene and methyl methacrylate (containing 0.1% t-dodecyl mercapant, based on the weight of the monomer mixture) to a aliquot of a freshly-prepared rubber latex which has not been exposed to air and which contains 100 parts of rubber solids, (2) heating the resultant reaction mixture at 50° C. for 18 hours in the absence of added catalyst or emulsifying agent to obtain complete polymerization of the monomer mixture, (3) adding 2 parts of a styrenated phenol antioxidant and 0.2 part of a polymerization shortstop to the latex, and (4) recovering polymer solids by drum drying. Each of the products, designated as Graft Copolymers A–D, is a graft copolymer contaminated with a minor amount of co-formed styrene-methyl methacrylate copolymer.

Table I shows (a) the amount of monomer mixture polymerized in the latex of 100 parts of rubber, (b) the styrene/methyl methacrylate (S/MM) ratio in the monomer mixture, and (c) the particular rubber latex employed in the preparation of each of the graft copolymers.

TABLE I

| Graft Copolymer | Monomer Mixture (parts) | S/MM Ratio | Rubber Latex Employed |
|---|---|---|---|
| A | 40 | 50:50 | A. |
| B | 40 | 67:33 | A. |
| C | 60 | 67:33 | A. |
| D | 60 | 67:33 | B. |

Example I

Prepare each of Polyblends I–VII by (1) mixing a rigid polymer and a graft copolymer in such proportions that the rubber substrate of the graft copolymer constitutes 20% by weight of the mixture and (2) milling the mixture for 3 minutes on a rubber mill having the roll temperatures set at about 340° F. Extrude each of the polyblends, grind it to a fine powder, and injection-mold samples for the measurement of physical properties.

The particular rigid polymers and graft copolymers employed in the preparation of each of the polyblends and the physical properties of the polyblends are shown in Table II. The surfaces of all of the injection molded samples of the polyblends are smooth and glossy.

TABLE II

| Polyblend | I | II | III | IV | V | VI | VII |
|---|---|---|---|---|---|---|---|
| Rigid Polymer Component | A | A | A | A | B | B | C |
| Graft Copolymer Component | A | B | C | D | A | B | A |
| Impact Strength at 25° C. (ft. lbs./in. of notch) | 3.4 | 3.3 | 5.9 | 3.9 | 1.1 | 0.8 | 1.4 |
| Tensile Strength at Yield (p.s.i.) | 3,960 | 4,120 | 4,290 | 5,600 | 5,850 | 5,610 | 5,150 |
| Elongation at Yield (percent) | 2.2 | 1.7 | 1.6 | 2.0 | 2.3 | 2.6 | 2.2 |
| Elongation at Fail (percent) | 31.4 | 24.7 | 25.2 | 11.4 | 11.0 | 7.4 | 21.0 |
| Modulus in Tension (p.s.i.×10⁻⁵) | 2.8 | 2.7 | 2.8 | 2.9 | 3.1 | 3.1 | 2.8 |

The rigid component of the polyblends of the invention is a thermoplastic polymer or mixture of two or more thermoplastic polymers having a modulus of elasticity of at least $1.5 \times 10^5$ p.s.i. at 25° C., as determined by ASTM test D638–52T, and consisting of:

(1) 50–100% by weight of a chemically-combined monovinyl aromatic monomer, e.g., styrene; an ar-alkylstyrene such as vinyl toluene, 2,4-dimethylstyrene, 2,4-diethylstyrene, etc.; an ar-halostyrene such as 2-chlorostyrene, 4-bromostyrene, 2,4-dichlorostyrene, etc.; an ar-alkyl-ar-halostyrene such as 2-chloro-5-methylstyrene, 2,6-dichloro-4-methylstyrene, etc.; vinyl naphthalene; and mixtures thereof, and (2) 0–50% by weight of a chemically-combined comonomer of the group consisting of (a) acyclic conjugated 1,3-diene such as butadiene, isoprene, piperylene, etc., (b) acrylonitrile, (c) methacrylonitrile, (d) a $C_1$–$C_4$ alkyl acrylate or methacrylate such as methyl acrylate, butyl acrylate, methyl methacrylate, etc., (e) an alpha-alkylstyrene wherein the alpha-alkyl group contains 1–2 carbon atoms, e.g., alpha-methylstyrene; alpha-ethylstyrene; an alpha-alkyl-ar-alkylstyrene such as alpha-methylvinyl toluene, alpha-methylvinyl xylene, etc.; an alpha-alkyl-ar-halostyrene such as alpha-methyl-2-chlorostyrene; an alpha-alkyl-ar-alkyl-ar-halostyrene such as alpha-methyl-2-methyl-4-chlorostyrene, etc., and (f) mixtures thereof.

The particularly preferred rigid polymers are polystyrene and interpolymers of about 60–85% by weight of styrene and/or p-methylstyrene and, correspondingly, about 40–15% by weight of acrylonitrile, methyl methacrylate and/or alpha-methylstyrene.

The graft copolymer component of the polyblends of the invention is a product obtained by polymerizing 25–100 parts by weight of a mixture of a monovinyl aromatic monomer and a lower alkyl acrylate monomer in an aqueous dispersion of 100 parts by weight of a diene rubber. The monomer mixture employed in the graft copolymerization reaction consists essentially of (1) about 20–80%, preferably about 40–75%, by weight of a monovinyl aromatic monomer, e.g., styrene; an ar-alkylstyrene such as vinyl toluene, 2,4-dimethylstyrene, 2,4-diethylstyrene, etc.; an ar-halostyrene such as 2-chlorostyrene, 4-bromostyrene, 2,4-dichlorostyrene, etc.; an ar-alkyl-ar-halostyrene such as 2-chloro-5-methylstyrene, 2,6-dichloro-4-methylstyrene, etc.; vinyl naphthalene; and mixtures thereof, and (2) correspondingly, about 80–20%, preferably about 60–25%, by weight of a $C_1$–$C_4$ alkyl acrylate or methacrylate, e.g., methyl acrylate, butyl acrylate, methyl methacrylate, etc. According to a preferred embodiment of the invention, the monomer mixture consists essentially of about 40–75% by weight of styrene and/or p-methylstyrene and, correspondingly, about 60–25% by weight of methyl methacrylate.

The diene rubber employed in the preparation of the graft copolymer is a rubbery polymer having a second order transition temperature not higher than 0° C., preferably lower than −20° C., as determined by ASTM test D746–52T, and consisting of:

(1) About 50–100% by weight of a chemically-combined acyclic conjugated 1,3-diene such a butadiene, isoprene, 2,3-dimethylbutadiene, piperylene, etc., (2) Up to about 50% by weight of a chemically-combined monovinylidene aromatic monomer of the group consisting of (a) a monovinyl aromatic monomer, e.g., styrene; an ar-alkylstyrene such as vinyl toluene, 2,4-dimethylstyrene, 2,4-diethylstyrene, etc.; an ar-halostyrene such as 2-chlorostyrene, 4-bromostyrene, 2,4-dichlorostyrene, etc.; an ar-alkyl-ar-halostyrene such as 2-chloro-5-methylstyrene, 2,6-dichloro-4-methylstyrene, etc.; vinyl naphthalene; and mixtures thereof, (b) an alpha-alkylstyrene wherein the alpha-alkyl group contains 1–2 carbon atoms, e.g., alpha-methylstyrene; alpha-ethylstyrene; an alpha-alkyl-ar-alkylstyrene such as alpha-methylvinyl toluene, alpha-methylvinyl xylene, etc.; an alpha-alkyl-ar-halostyrene such as alpha-methyl-2-chlorostyrene; an alpha-alkyl-ar-alkyl-ar-halostyrene such as alpha-methyl-2-methyl-4-chlorostyrene, etc., and (c) mixtures thereof, (3) Up to about 20%, preferably not more than about 10%, by weight of a chemically-combined acrylic monomer of the group consisting of (a) a $C_1$–$C_8$ alkyl acrylate such as methyl acrylate, ethyl acrylate, n-propyl acrylate, octyl acrylate, etc., (b) the corresponding alkyl methacrylates, (c) acrylonitrile, (d) methacrylonitrile, and (e) mixtures thereof, and (4) Up to about 2% by weight of a chemically-combined polymerizable monomer containing a plurality of non-conjugated terminal ethylenic groups, e.g., divinyl benzene, diallyl maleate, etc.

Such diene rubbers can be prepared by emulsion polymerization techniques which are well known in the art, e.g., by the methods disclosed in U.S. 2,755,270 from column 3, line 49, to column 4, line 19. The preferred diene rubbers are homopolymers of butadiene or isoprene and interpolymers of 50–95% by weight of butadiene or isoprene and 50–5% by weight of a monovinylidene aromatic monomer.

The graft copolymers can be prepared by polymerizing the mixture of the monovinyl aromatic monomer and the lower alkyl acrylate monomer in an aqueous dispersion of the diene rubber by methods which are well known and reported in the literature. It will usually be found desirable to conduct the graft copolymerization reaction under conditions which favor high grafting efficiency, e.g., by employing a freshly-prepared diene rubber dispersion which has not been exposed to air and by not adding supplemental emulsifying agent to the diene rubber dispersion.

In the polyblends of the invention, the rigid thermoplastic polymer and graft copolymer are combined in such proportions that the graft copolymer substrate constitutes about 5–40% by weight of the admixture. In addition to these polymeric components, the polyblends can contain fillers, plasticizers, pigments, dyes, lubricants, antioxidants, heat and light stabilizers, destaticizing agents, and other conventional additives.

The polyblends can be prepared by blending latices of the rigid thermoplastic polymer and the graft polymer and recovering solids from the mixed latices but are preferably prepared by malaxating a mixture of the two polymers on conventional plastics working equipment such as rubber mills, Banbury mixers, extruders, etc. Regardless of the manner in which the polyblend is prepared, it should be worked at elevated temperatures for a time sufficient to fuse the polymers and form an intimate physical admixture in order to obtain optimum physical properties.

The fact that the polyblends of this invention can be prepared by simply malaxating the rigid thermoplastic polymer and the graft copolymer on conventional plastics working equipment is a matter of considerable importance.

As far as is known, the present invention provides one of the few methods by which polyblends having truly high impact strength can be prepared when a mass-polymerizing polystyrene is employed as the rigid phase of the polyblend. As illustrated by Polyblends I–IV of Table II, such polyblends containing a mass-polymerized polystyrene have impact strengths in excess of 2 ft. lbs./in. of notch.

The polyblends of the invention can be employed in the manufacture of high-strength injection moldings, in the production of extruded sheets, and in the preparation of high-strength articles by other fabrication methods known in the art. An outstanding feature of these polyblends is their excellent surface properties: molded and extruded articles prepared from the polyblends have materially smoother and significantly glossier surfaces than corresponding articles fabricated from blends of the rigid thermoplastic polymers with diene rubbers or with graft copolymers of styrene on a diene rubber.

It is obvious that many variations can be made in the products and processes set forth above without departing from the spirit and scope of this invention.

What is claimed is:

1. An intimate physical admixture of polymeric components consisting of (A) polystyrene and (B) a graft copolymer prepared by polymerizing about 25–100 parts by weight of a monomer mixture consisting essentially of 20–80% by weight of styrene and, correspondingly, 80–20% by weight of methyl methacrylate in an aqueous dispersion of 100 parts by weight of rubbery polymer having a second order transition temperature not higher than about 0° centigrade, as determined by ASTM Test D746–52T, selected from the group consisting of polybutadiene, polyisoprene, interpolymers of 50–95 weight percent of butadiene and 50–5 weight percent of styrene and interpolymers of 50–95 weight percent of isoprene and 50–5 weight percent of styrene; said polystyrene and graft copolymer being combined in such proportions that the graft copolymer substrate constitutes 5–40% by weight of the admixture.

2. The composition of claim 1 wherein the monomer mixture consists essentially of 40–75 percent by weight of styrene and 60–25 percent by weight of methyl methacrylate.

3. The consumption of claim 1 wherein the rubbery polymer is polybutadiene.

References Cited by the Examiner

UNITED STATES PATENTS

| | | | |
|---|---|---|---|
| 2,755,270 | 7/1956 | Hayes | 260—876 |
| 2,802,808 | 8/1957 | Hayes | 260—880 |
| 2,841,569 | 7/1958 | Rugg et al. | 260—878 |
| 2,843,561 | 7/1958 | Ingley et al. | 260—880 |
| 2,943,074 | 6/1960 | Feuer | 260—880 |
| 3,018,268 | 1/1962 | Daly | 260—876 |
| 3,062,777 | 11/1962 | Allen et al. | 260—876 |

FOREIGN PATENTS

| | | |
|---|---|---|
| 165,472 | 3/1954 | Australia. |
| 726,583 | 3/1955 | Great Britain. |

OTHER REFERENCES

Hart: "Industrie Chemique Belge," vol. 21, 1956, pp. 1053–1063).

MURRAY TILLMAN, *Primary Examiner.*

LEON J. BERCOVITZ, *Examiner.*

V. A. MORGENSTEIN, G. F. LESMES,
*Assistant Examiners.*